United States Patent [19]

O'Connor et al.

[11] 4,022,423
[45] May 10, 1977

[54] CONTROL VALVE

[75] Inventors: Joseph O'Connor, Goshen; Henry Illing, Parksville, both of N.Y.

[73] Assignee: Kieley & Mueller, Inc., Middletown, N.Y.

[22] Filed: July 30, 1975

[21] Appl. No.: 600,563

[52] U.S. Cl. .................. 251/127; 415/126; 415/203
[51] Int. Cl.² ............... F16K 47/00; F16L 55/02
[58] Field of Search ...... 415/131, 203, 205, 219 C, 415/126; 251/127

[56] References Cited

UNITED STATES PATENTS

| 27,448 | 3/1860 | Horton | 415/203 |
| 340,120 | 4/1886 | Hussey | 415/203 |
| 2,041,570 | 5/1936 | Reiffenstein | 415/205 |
| 3,404,631 | 10/1968 | Nixon | 415/126 |
| 3,647,314 | 3/1972 | Laessig | 415/219 C |
| 3,709,245 | 1/1973 | O'Connor, Jr. | 251/127 |
| 3,779,514 | 12/1973 | O'Connor, Jr. | 251/127 |

FOREIGN PATENTS OR APPLICATIONS

| 808,796 | 7/1951 | Germany | 415/131 |
| 1,813,803 | 12/1968 | Germany | 415/131 |
| 84,046 | 8/1935 | Sweden | 415/205 |
| 92,232 | 12/1921 | Switzerland | 415/131 |

Primary Examiner—Henry F. Raduazo
Attorney, Agent, or Firm—Kenyon & Kenyon Reilly Carr & Chapin

[57] ABSTRACT

The control valve uses a rotor assembly to control the flow through the valve. The rotor assembly is rotatably mounted within the valve housing and cooperative with a scroll-shaped means in the flow passage which directs the flow of fluid circumferentially around and then through the bladed portion of the rotor assembly. The rotor assembly converts the motion of the fluid therethrough into rotational movement, thereby creating a predictable pressure drop. Means are provided for varying the pressure drop, namely, by axially positioning the rotor assembly relative to the opening formed by the valve seat.

7 Claims, 2 Drawing Figures

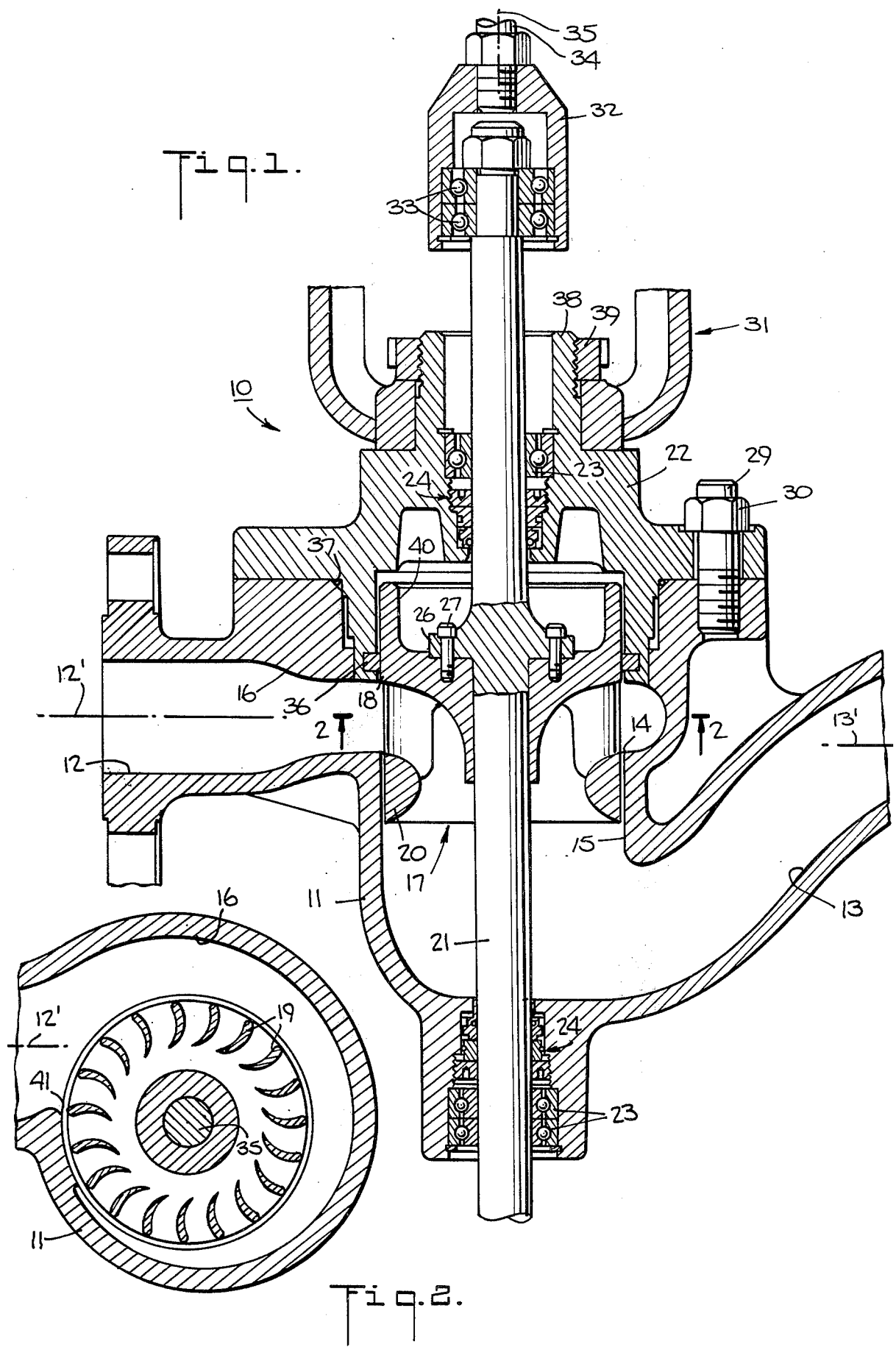

CONTROL VALVE

This invention relates to a control valve, suitable for process control systems, and more particularly, a statorless control valve.

Control valves which utilize rotors for controlling fluid flow and for extracting work have been known, for example as described in U.S. Pat. No. 3,709,245. In such valves, the rotors have been used in conjunction with a stator in order to control the fluid flow. However, it has been found that these valves may be modified by omitting the stator. As a result, because there are no turning or churning losses due to the use of a stator, the efficiency of the valve as a power extraction device becomes increased. Further, the resulting structure can be manufactured at a lower cost while providing increased reliability and simplifying manufacture.

Briefly, the invention provides a control valve which can provide a controlled pressure drop when interposed in a flow system. The control valve comprises a housing which defines a passageway for a flow of fluid; the passageway having an inlet, outlet, a valve seat between the inlet and outlet and a means defining a scroll-shaped flow path between the inlet and valve seat. In addition, the control valve has a rotor assembly positioned in the path of the fluid flow. This rotor assembly has a valve seat ring for sealingly seating on the valve seat as well as a plurality of circumferentially disposed vanes which are selectively mounted within the scroll-shaped flow path for rotation under the flow of fluid passing therethrough. In addition, the control valve has a means for moving the rotor assembly relative to the valve seat between a position in which the valve seat ring is in sealing relation with the valve seat, and the vanes are out of the flow path and a position in which the valve seat ring is raised from the valve seat and the vanes are in the flow path to a greater or lesser extent. The scroll-shaping means surrounds the rotor assembly in order to direct the flow of fluid from the inlet passage circumferentially around and through the rotor assembly. The rotation of the rotor assembly as in the case of the above-mentioned patent provides a means for controlling the pressure drop across the valve. The pressure drop can be varied by the means which is provided to move the rotor assembly in the flow path of the fluid. Means can also be provided, operative on the rotor assembly, which produce a drag force on the assembly which results in a corresponding pressure drop.

In order to facilitate the flow of fluid through the rotor assembly, the rotor assembly and valve seat ring are disposed on a longitudinal axis which, in turn, is disposed in spaced relation to a transversely disposed axis of the inlet.

In order to facilitate the flow of fluid through the rotor assembly, an annular curvilinear shaped ring is mounted downstream of the vanes. The shape of this ring is intended to permit a laminar-type of flow so as to avoid cavitation. The rotor assembly may have the valve seat ring, vanes and curvilinear shaped ring integrally formed into a one-piece unit for ease in assembly of the control valve.

These and other objects and advantages of the invention will become more apparent from the following detailed description and appended claims taken in conjunction with the accompanying drawings in which:

FIG. 1 illustrates a cross-sectional elevation view of a control valve constructed in accordance with the invention; and FIG. 2 illustrates a section view taken along line 2—2 of FIG. 1.

Referring to FIGS. 1 and 2, the control valve 10 comprises a housing 11 which has a passageway for a flow of fluid which includes an inlet 12, an outlet 13 and a valve seat 14 which defines an orifice 15 for the fluid flow. The passageway also has a means defining a scroll-shaped portion 16 upstream of the valve seat 14 for directing the fluid flow in a swirl pattern to the orifice 15. To this end, the axis of the orifice 15 is offset from the axis of the inlet 12. The scroll shaped means 16 is of reduced height relative to the inlet 12 and includes a transition zone at the upstream end to direct the fluid flow into the reduced portion.

The control valve 10 also has a rotor assembly 17 interposed in the flow path. This rotor assembly 17 includes a valve seat ring 18 (formed in a similar fashion to a valve plug), a plurality of circumferentially disposed vanes 19 and an annular ring 20 having a cross-section which is of curvilinear shape to the inside. The valve seat ring 18 and ring 20 together define an annular flow path of narrowing size with the shape of the ring 20 being such as to avoid cavitation in the fluid flow.

As shown in FIG. 1, the upstream faces of the vanes 19 are of a height, as viewed, equal to the height of the reduced portion of the scroll-shaped means 16. As indicated in FIG. 2, the vanes 19 are of a turbine type having a suction side and a pressure side. As shown, each of the vanes 19 has an inlet edge adjacent the reduced height portion of the scroll-shaped means or path 16. Thus, upon impingement by a fluid flow on the pressure side, that is, the concave side as viewed, the rotor assembly 17 is caused to rotate.

A means is also provided in the valve for moving the rotor assembly 17 relative to the valve seat 14 between a closed position and an open position (as viewed in FIG. 1). This means includes a shaft 21 which is rotatably mounted within the housing and passages through the upper and lower ends of the housing 11 as viewed. For this purpose, the upper end of the housing is formed with a bonnet 22 in which a suitable bearing and sealing arrangement is located for the shaft 21. For example, the arrangement includes a radial bearing 23 which permits rotation of the shaft 21 relative to the bonnet 22 and a stuffing box arrangement 24 for sealing the interior of the housing 11 from the exterior. the lower end of the housing 11 is provided with a similar bearing 23 and sealing 24 arrangement.

The shaft 21 includes a collar portion 25 which fits into a recess 26 within the valve seat ring 18 of the rotor assembly 17 and threaded bolts 27 are passed through the color portion into threaded engagement within suitable threaded bores within the valve seat ring 18 in order to secure the rotor assembly 17 to the shaft 21.

As shown in FIG. 1, the bonnet 22 is secured to the remainder of the housing 11 by a plurality of threaded screws 29 and nuts 30. The bonnet may also carry any other suitable housing structure 31 as is known.

The shaft 21 is secured at an upper end within a coupling 32 in order to rotate relative to the coupling 32. To this end the coupling is provided with a recess into which the shaft 21 fits and a plurality of radial and thrust bearings 33 are provided to mount the shaft 21 rotatably within the coupling 32. The coupling 32 is otherwise secured to a control shaft 34 which moves axially along a longitudinal axis 35.

In order to facilitate the flow of fluid in the scroll-shaped means 16 in the housing, the longitudinal axis 35 of the rotor assembly 17 is offset, that is, disposed in spaced relation to the transversely disposed axis 12' of the inlet 12. The axis 13' of the outlet 13 may also be offset from the axis of the inlet 12 so as to intersect with the axis 35 or may be aligned vertically as viewed with the inlet axis 12' so as to be spaced transversely of the axis 35.

Referring to FIG. 1, the valve seat ring 18 is of slightly larger diameter than the ring 20 so as to sealingly engage with the valve seat 14 which is of slightly less diameter than the valve seat ring 18. For this purpose, both the valve seat ring 18 and the valve seat 14 are provided with chamfered sealing surfaces as is known. Further, a seal 36 is mounted within the bonnet 22 so as to seal the rotor assembly relative to the upper end of the housing 11. Additional seals 37 may also be provided between the bonnet 22 and the remainder of the housing 11.

As shown in FIG. 1, the unit 31 may be secured to the bonnet 22 by any suitable means such as by use of a threaded stem 38 on the bonnet which cooperates with a threaded nut 39.

Also, the rotor assembly may be formed with a recessed portion 40 which serves to define a chamber between the rotor assembly 17 and the upper portion of the housing 11, that is, the bonnet 22.

As shown in FIG. 2, the housing 11 is provided with a raised portion 41 which projects towards the rotor assembly 17. This raised portion 41 serves to direct the "tailend" of a fluid flow into the rotor assembly in order to prevent a return of the flow to the upstream end of the scroll-like passage.

In operation, with the valve in the open position as illustrated in FIG. 1, a flow of fluid enters the inlet 12. Upon continued flow, the fluid passes into the scroll-shaped flow path and thence passes directly circumferentially around and through the rotor assembly vanes 19. During this time, the rotor assembly 17 is caused to rotate under the force of the fluid flow. The fluid flow continues through the rotor assembly over the annular ring 20 and passes out of the control valve through the outlet 13.

As the rotor assembly 17 is caused to rotate by the fluid flow, the shaft 21 is also rotated. This rotation may be used for similar purposes as that described in the above-mentioned U.S. patent. For example, the rotation of the shaft 21 may be used to do work in another part of a system utilizing the control valve. The mounting of the shaft 21 would, of course, be otherwise than as shown in FIG. 1, where work is to be taken from the shaft. For example, the shaft 21, instead of being rotatably mounted within a coupling 32, may be fixedly mounted within a coupling which is secured to some other work receiving unit. The shaft 21 may also be used as illustrated, simply to create a pressure drop in the fluid passing through the valve.

In order to vary the amount of pressure drop for a given flow, the rotor assembly 17 is raised or lowered by movement of the stem 34, as by a handwheel (not shown). For example, from the completely open position as shown in FIG. 1, the stem 34 may be lowered so that the valve seat ring 18 is moved towards the valve seat 14 into a closed position. In any of the intermediate positions between the fully open and fully closed position, the flow passing through the vanes 19 of the rotor assembly is decreased proportionally.

When the rotor assembly 17 has been brought into sealing engagement with the valve seat 14, the control valve 10 is in a closed position.

While the movement of the rotor assembly 17 has been described as a manual operation, automated operation may also be utilized. For example, an auxiliary power operated device such as a diaphragm motor actuator, an electric motor actuator or piston actuator may also be used to position the rotor assembly 17 within the housing 11 in accordance with a received signal.

The invention thus provides a valve utilizing a rotor assembly for control purposes which is of simple construction. To this end, the rotor assembly may be made in one piece and easily fitted to a rotatably mounted shaft within the valve. Furthermore, there is no need to incorporate a stator as in previous control valves of this type.

What is claimed is:

1. A control valve comprising
a housing having an axis and a passageway for a flow of fluid, said passageway having an inlet of predetermined height parallel to said axis, an outlet, a valve seat between said inlet and said outlet, and said passageway having means defining a vane-less scroll-shaped flow path between said inlet and said valve seat for a free flow of fluid through said inlet to said valve seat, said path having a portion of reduced height relative to the height of said inlet and including a transition zone between said inlet and said reduced height portion of said path;
a rotor assembly mounted for rotation about said axis and having a valve seat ring for sealingly seating on said valve seat, a plurality of circumferentially disposed vanes selectively mounted within said scroll-shaped flow path for rotation under the flow of fluid passing therethrough, each said vane having an inlet edge adjacent said reduced height portion, and an annular curvilinear shaped ring adjacent said vanes for guiding a flow of fluid thereover; and
means for moving said rotor assembly relative to said valve seat between a position in which said valve seat ring is in sealing relation with said valve seat and said vanes are out of the flow path and a position in which said valve seat ring is spaced from said valve seat and said vanes are in the flow path.

2. The valve of claim 1 further comprising means for inducing a drag force on said rotor assembly in a direction opposite to the direction of rotation of said rotor under the flow of fluid passing therethrough, whereby a controlled pressure drop is created in the fluid flow path.

3. A control valve as set forth in claim 1 wherein said valve seat ring is disposed on a longitudinal axis disposed in spaced relation to a transversely disposed axis of said inlet whereby said scroll-shaped flow path directly delivers a flow of fluid circumferentially around and through said vanes.

4. A control valve as set forth in claim 1 wherein said means for moving said rotor assembly includes a shaft secured to said valve seat ring and rotatably mounted in and passing through said housing.

5. A control valve as set forth in claim 1 wherein said ring, said vanes and said valve seat ring are integrally formed into a one-piece unit.

6. A control valve as set forth in claim 1 wherein said housing includes a raised portion projecting towards said rotor assembly to prevent a return of the flow of fluid to the upstream end of said scroll-shaped flow path.

7. A control valve as set forth in claim 1 wherein said valve seat ring and said annular ring define an annular flow path of narrowing size with the shape of said annular ring being such as to avoid cavitation in the fluid flow.

* * * * *